Patented July 8, 1941

2,248,279

UNITED STATES PATENT OFFICE 2,248,279

WELDING ROD

Agostino Nepoti, Sesto Calente, Italy

No Drawing. Application August 18, 1939, Serial No. 290,919. In Italy September 1, 1938

2 Claims. (Cl. 219—8)

The invention relates to processes wherein metal is fused by the electric arc between an electrode and the pieces to be welded together. More particularly, the invention relates to the composition of the metal added in such operation.

When the usual known welding rods are used, it is found that the tensile strength of the welding line does not reach or reaches only with special difficulty the tensile strength of the materials constituting the two pieces to be welded together. This inconvenience occurs particularly when the tensile strength of the material constituting the pieces to be welded presents a high value, for instance of 100 to 110 kg./mm.$^2$. In this occurrence it is necessary that also the material constituting the welding line obtained by means of the fusion of the welding rod should present an analogous tensile strength of about 100 to 110 kg./mm.$^2$.

This might be obtained by increasing the content of carbon in the alloy with which the welding rod is made. But such an increase of the content of carbon causes serious inconveniences and particularly that the material constituting the welding line becomes so particularly sensitive to the thermal actions necessarily developed during the welding operations, that the welding line becomes hardened. It follows that, after the union through welding of the pieces, the unit which is obtained must be submitted to a suitable thermal treatment in order to eliminate the dangerous characteristics caused by the hardening in the metal constituting the welding line. But such thermal treatment is not usually possible; in fact the dimensions of the unit obtained by the welding operations are often such as to render impossible the introduction of said unit in the metallurgic ovens for the thermal treatment.

The object of the present invention is to overcome these inconveniences and to provide a welding alloy which will produce a welding line which presents a tensile strength of about 100 to 110 kg./mm.$^2$ and contemporaneously is insensitive practically to the effects of the thermal actions necessarily developed during the welding operations.

My copending U. S. Patent application No. 245,506 discloses an alloy for welding rods which presents analogous properties, but gives for the welding line a tensile strength of only 70 to 75 kg./mm.$^2$.

As aforesaid, it is known that, in order to increase the tensile strength, the percentage of carbon in the alloy constituting the welding rod may be increased; but it is also known that in this manner the very serious difficulty arises of having the welding seam or line very sensitive to the thermal actions of the welding (hardening) and with low coefficient of elongation; otherwise, an alloy for welding rod having a given percentage of carbon gives for the welded seam a coefficient of tensile stress which, besides other considerations, is a function of said percentage. When the percentage of carbon is increased, the tensile strength of the welding seam is increased, but the properties of the welding rod with respect to the welding operation are damaged.

A first characteristic of the invention is based on the following:

Let us consider a given alloy having such a percentage of carbon that the properties of the welding rod with respect to the welding, will be damaged if the percentage of carbon should be increased; if with such alloy the percentage of carbon is increased while contemporaneously an addition of vanadium (V) is made, this addition first serves to increase the tensile strength of the welding seam, and moreover permits the aforesaid increase of the percentage of carbon (which in its turn also increases the tensile strength) thus eliminating the difficulties which have been mentioned.

Another characteristic of the alloy for said welding rod according to the present invention, is the following: Let us consider an alloy having a percentage of carbon not above 0.20%, a percentage of Mn not superior than 1.8% and a percentage of Cr of 1.2%; this alloy would give for the welded line a fine grained structure owing to the thermal actions necessarily developed during the welding operation. This indicates that said alloy is sensitive to the thermal welding actions, that is, that the welding line becomes hardened. If to such an alloy a suitable percentage of Mo and of V is added, the fine grained structure will no more appear, namely the welding seam will not be sensitive to the welding actions, that is will not be hardened.

As a consequence of the aforesaid properties (that is high tensile strength and insensitivity to the welding thermal actions) it results, indirectly, that said alloy presents also invariability in the elongation.

Besides the aforesaid main characteristics, the adding of vanadium produces a very high elastic limit and an increase of the fatigue limit.

The addition of chromium and of molybdenum permits a reduction in the percentage of manganese; but, owing to the cost of the chromium and of the molybdenum, it is not possible to use said elements abundantly if an industrially economical product is to be obtained. It is also known that a very small percentage of silicon is necessarily present in said alloys, as an impurity; the reduction of said percentage or the complete elimination of silicon is too expensive.

In order to give to a technician the possibility of realizing the invention, the maxima and minima percentages and a practical embodiment are hereinafter given only by way of example.

The maxima and minima percentages of the constituents of the alloy are about as follows:

*Carbon:* from 0.15 to 0.25% and substantially not more, because otherwise the welded line will be sensitive to the hardening action, or otherwise will require a further increase of the percentage of vanadium which is a very expensive constituent. This does not exclude the production of alloys of higher carbon content with a contemporaneous further addition of vanadium in order to always maintain the insensitivity to the welding actions.

*Manganese:* from 1.2 to 1.8%. The percentage of manganese could also be below the minimum above indicated if it would be possible to increase the percentage of chromium, while said increase of chromium is limited owing to its cost.

*Silicium:* from 0.1 to 0.4%. This constituent must be considered as an impurity which is necessarily present owing to the method of production; said percentage could be reduced if this reduction was not too expensive.

*Chromium:* from 0.6 to 1.2% and also more if said constituent had not such a high price. An increase in the percentage of chromium would permit the lowering of the percentage of the manganese.

*Molybdenum:* from 0.3 to 0.8% and also more if the increase of said percentage should not cause an increase in the cost of the production.

*Vanadium:* from 0.3 to 0.8% and also more if the increase of said percentage should not cause an increase in the cost of the production.

The tensile strength of the metal constituting the welding line may range from 100 to 110 kg./mm.$^2$, with an elastic limit corresponding to 70 to 80 kg./mm.$^2$, and with an elongation of about 12 to 14% (measured on a test piece having a length corresponding to 10 diameters).

The following is a practical example of a composition of welding rod and of the material constituting the welding line:

|  | Per cent |
|---|---|
| Carbon | 0.17 |
| Manganese | 1.5 |
| Silicon | 0.3 |
| Chromium | 1.0 |
| Molybdenum | 0.4 |
| Vanadium | 0.4 |

Various modifications can be made in the invention as described above. For instance, uncoated welding rods can be used which will produce welding lines having the characteristics previously stated, or it is possible to use a coating having only protective purposes. It is also possible to use a welding rod having a coating the constituents of which alloy with the metal of the welding rod to give a material for the welding line according the aforesaid composition. In this case part of the above alloying constituents will be derived from the coating. Owing to the fact that some of the ingredients of the coating become oxidized or volatilized, proper allowance must be made for these factors. This is especially true of the carbon and the manganese. It is therefore necessary to modify, according to known methods, the percentages of the constituents according to the type of the cover used and the purpose for which it is employed in order to obtain welding lines corresponding to the above indicated composition. These and other modifications of the invention are included within the scope of the following claims.

I claim:

1. An electric arc welding rod consisting of an iron alloy containing 0.15% to 0.20% carbon, 1.00% to 1.8% manganese, 0.1% to 0.4% silicon, 0.30% to 0.8% molybdenum, 0.6% to 1.00% chromium and 0.3% to 0.80% vanadium, a weld made of said alloy having a tensile strength of from 80 kg./sq. mm. to 110 kg./sq. mm., an elongation of about 12% measured on a weld having a length equal to 15 times its diameter, the material of the weld being substantially insensible to thermal action occurring during the welding operation.

2. An electric arc welding rod consisting of an iron alloy containing 0.17% carbon, 1.5% manganese, 0.30% silicon, 0.4% molybdenum, 1.00% chromium and 0.40% vanadium.

AGOSTINO NEPOTI.